April 10, 1934.  G. F. DALY ET AL  1,954,041
BILLING MACHINE
Filed Dec. 5, 1931    10 Sheets-Sheet 1
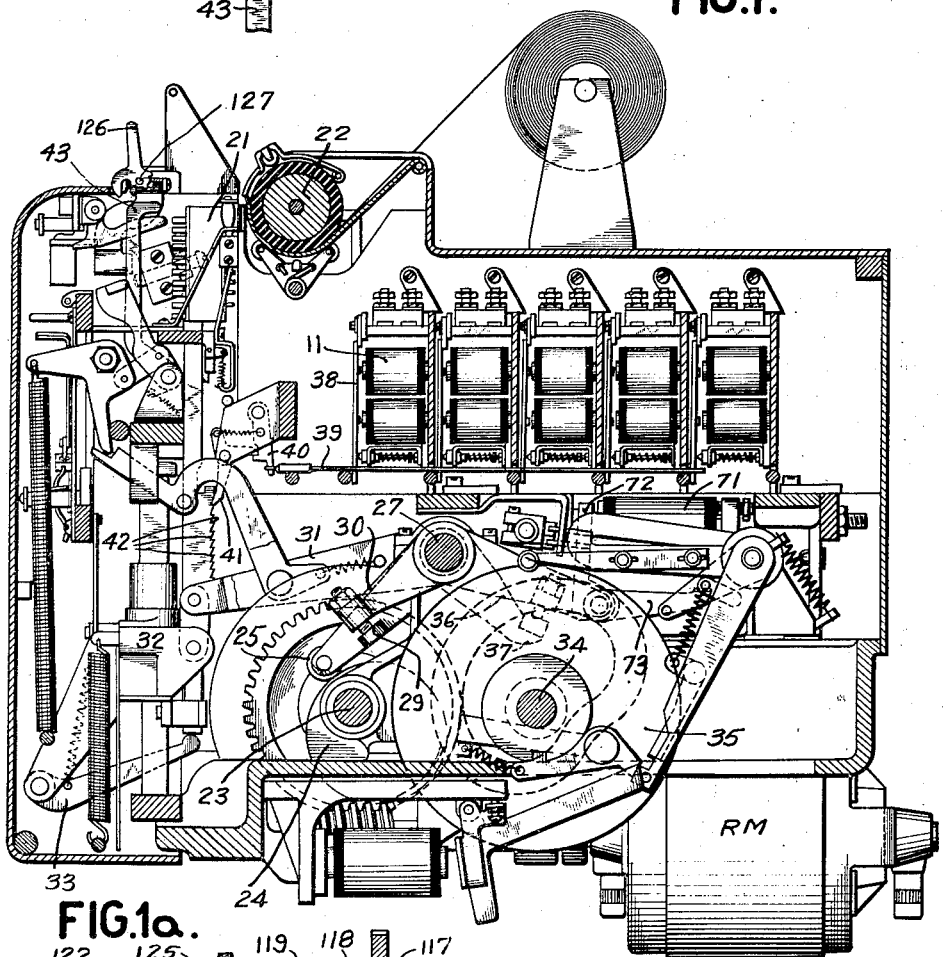

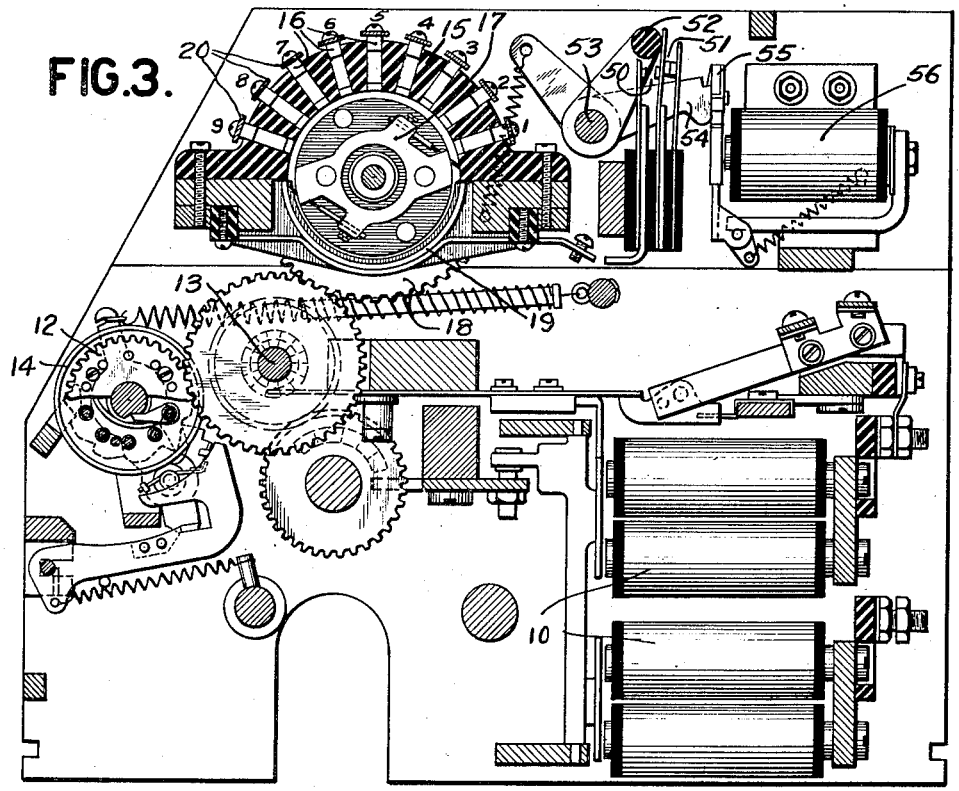

April 10, 1934.   G. F. DALY ET AL   1,954,041
BILLING MACHINE
Filed Dec. 5, 1931   10 Sheets-Sheet 3
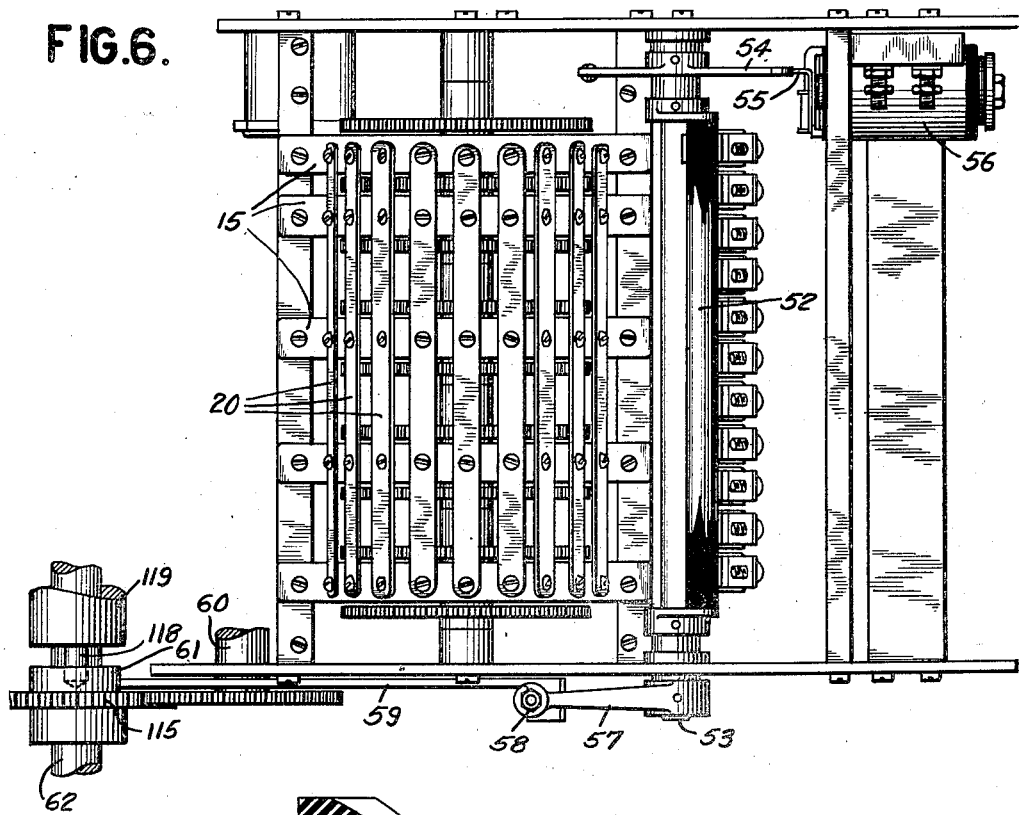
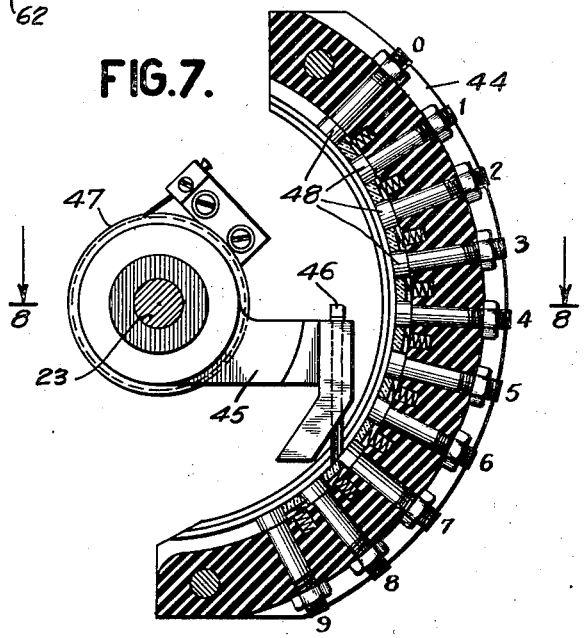

April 10, 1934.  G. F. DALY ET AL  1,954,041
BILLING MACHINE
Filed Dec. 5, 1931   10 Sheets-Sheet 4
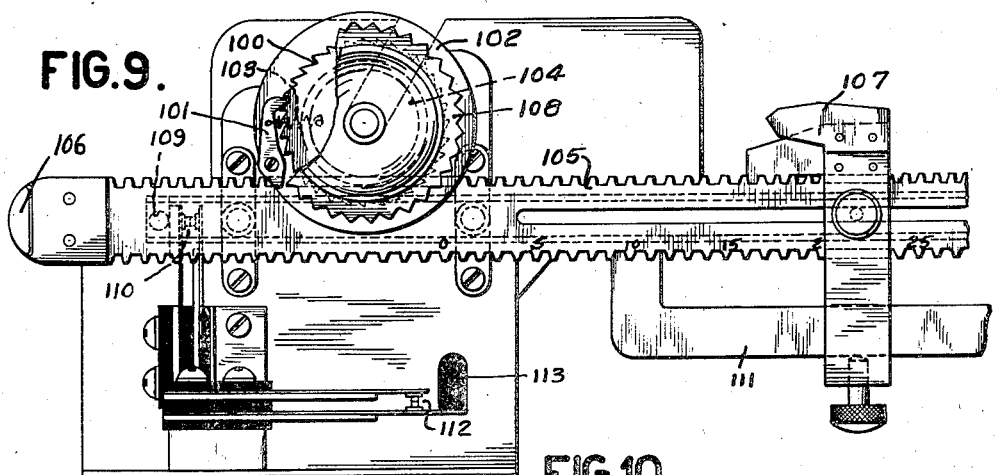
FIG. 9.
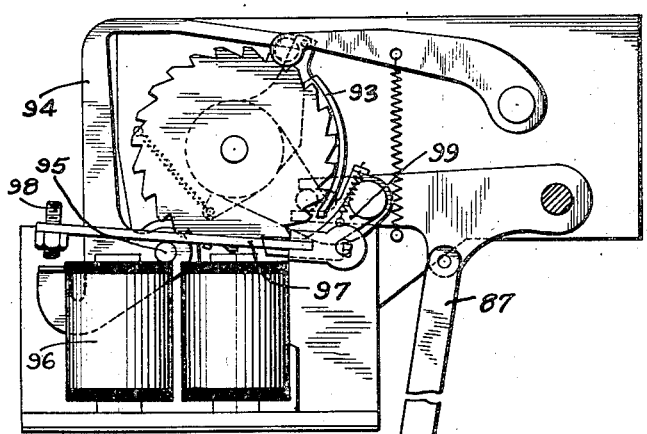
FIG. 10.
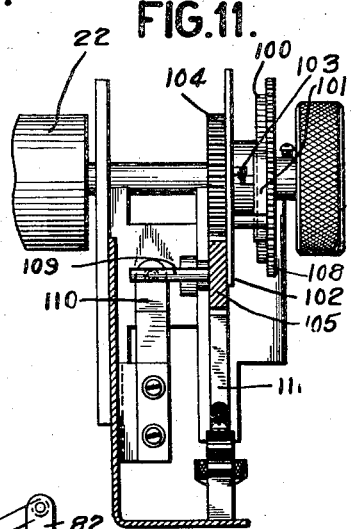
FIG. 11.
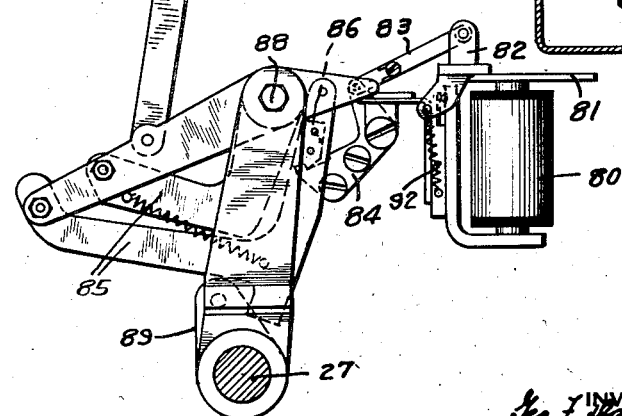

April 10, 1934.   G. F. DALY ET AL   1,954,041
BILLING MACHINE
Filed Dec. 5, 1931   10 Sheets-Sheet 5
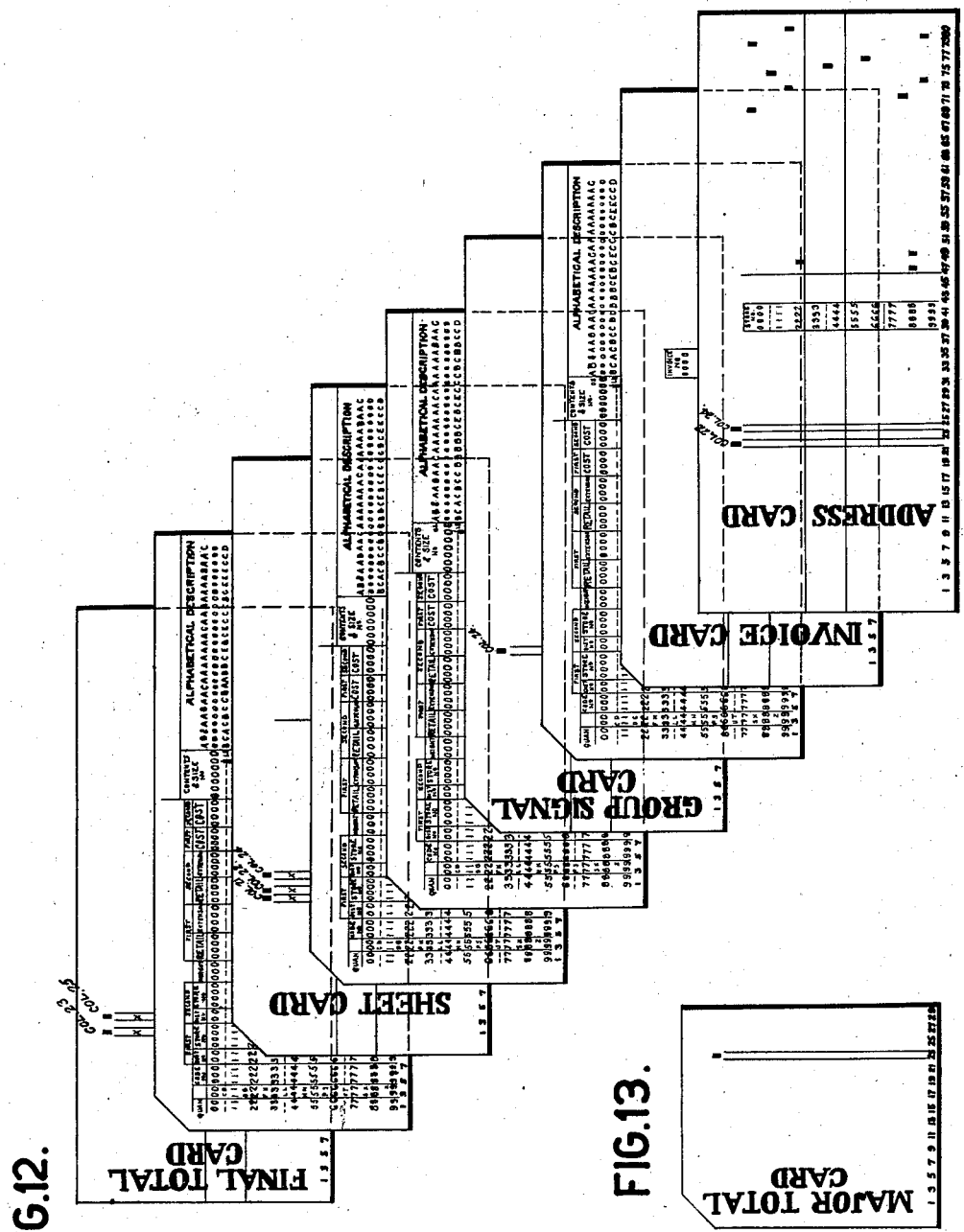

April 10, 1934.  G. F. DALY ET AL  1,954,041
BILLING MACHINE
Filed Dec. 5, 1931  10 Sheets-Sheet 6

FIG.14.

STORE INVOICE
CHAIN GROCERY COMPANY

OFFICE RECORD

| STORE NO | | | | LOCATION | | | | INVOICE NO | STORE NO | INVOICE NO | | |
|---|---|---|---|---|---|---|---|---|---|---|---|---|
| 1002 | | | 828 | A VOUBON AVE | | | | 20.01 | 1002 | 20.01 | | |
| CODE | UNITS | PKG | CONTENTS SIZE | COMMODITY | NAME AND BRAND | | RETAIL PRICE | RETAIL EXTENSION | CODE NO | RETAIL EXTENSION | UNITS | COST EXTENSION |
| 112 | 1 | PK | 06 No 2 | | APRICOTS | | 19 | 1.14 | 112 | 1.14 | 1 | .58 |
| 190 | 3 | PK | 12 28 oz | | ROOT | BEER | 22 | 7.92 | 190 | 7.92 | 3 | 5.67 |
| 254 | 1 | PK | 06 26 oz | NOODLES | | | 19 | 1.14 | 254 | 1.14 | 1 | .96 |
| 211 | 1 | PK | 06 16 oz | | GRAPE | JUICE | 29 | 1.74 | 211 | 1.74 | 1 | 1.49 |
| 215 | 1 | GT | 24 No 1 | | TOMATO | JUICE | 8 | 1.92 | 215 | 1.92 | 1 | 1.44 |
| 221 | 1 | GS | 12 28 oz | | ORANGEADE | | 13 | 1.56 | 221 | 1.56 | 1 | .92 |
| 223 | 1 | GS | 12 48 oz | | GINGERALE | | 13 | 1.56 | 223 | 1.56 | 1 | .92 |
| 248 | 1 | GS | 48 16 oz | BEANS | BAKED | | 9 | 4.32 | 248 | 4.32 | 1 | 3.36 |

STORE INVOICE
CHAIN GROCERY COMPANY

OFFICE RECORD

| STORE NO | | | | | LOCATION | | | INVOICE NO | STORE NO | INVOICE NO | | |
|---|---|---|---|---|---|---|---|---|---|---|---|---|
| 1002 | | | | SECOND FLOOR | | | | 20.01 | 1002 | 20.01 | | |
| CODE | UNITS | PKG | CONTENTS SIZE | COMMODITY | NAME AND BRAND | | RETAIL PRICE | RETAIL EXTENSION | CODE NO | RETAIL EXTENSION | UNITS | COST EXTENSION |
| 254 | 1 | PK | 06 | | NOODLES | | 19 | 1.14 | 254 | 1.14 | 1 | .96 |
| 268 | 1 | GS | 24 No 3 | | CUT | BEETS | 12 | 2.88 | 268 | 2.88 | 1 | 2.35 |
| 301 | 1 | GS | 12 32 oz | | DILL | PICKLES | 29 | 3.48 | 301 | 3.48 | 1 | 2.92 |
| 303 | 1 | GS | 06 32 oz | | SOUR | PICKLES | 29 | 1.74 | 303 | 1.74 | 1 | 1.32 |
| 325 | 1 | PK | 03 16 oz | | | OIL | 29 | .87 | 325 | .87 | 1 | .56 |
| 393 | 4 | PK | 06 8 oz | | | JELLY | 25 | 6.00 | 393 | 6.00 | 4 | 5.40 |
| 396 | 1 | PK | 06 15 oz | | GRAPELADE | | 23 | .78 | 396 | .78 | 1 | .56 |
| 398 | 1 | PK | 06 7 oz | | GRAPE | JELLY | 15 | .90 | 398 | .90 | 1 | .63 |
| 557 | 21 | | | | | | | 39.09 | 557 | 39.09 | 21 | 30.01 |

Geo. F. Daly
Jonas E. Slayyer
INVENTOR-
ATTORNEY-

April 10, 1934.   G. F. DALY ET AL   1,954,041
BILLING MACHINE
Filed Dec. 5, 1931   10 Sheets-Sheet 7

April 10, 1934.   G. F. DALY ET AL   1,954,041
BILLING MACHINE
Filed Dec. 5, 1931   10 Sheets-Sheet 8

April 10, 1934.    G. F. DALY ET AL    1,954,041
BILLING MACHINE
Filed Dec. 5, 1931    10 Sheets-Sheet 10

Patented Apr. 10, 1934

1,954,041

UNITED STATES PATENT OFFICE

1,954,041

BILLING MACHINE

George F. Daly, Johnson City, and Jonas E. Dayger, Binghamton, N. Y., assignors, by mesne assignments, to International Business Machines Corporation, New York, N. Y., a corporation of New York Application December 5, 1931, Serial No. 579,136

8 Claims. (Cl. 101—93)

This invention relates to accounting machines and more particularly to accounting machines of the perforated card controlled type. It is directed to improvements in tabulating machines of the type shown and described in the patent to G. F. Daly et al. No. 1,762,145 issued June 10, 1930.

It has for one of its objects the adaptation of such a machine to the automatic preparation of invoices on which data is recorded under control of various types of record cards. A machine having these general characteristics is shown and described in the copending application of G. F. Daly, Serial No. 496,437, filed November 18, 1930. The present invention is a further improvement of such machine with a view to increased efficiency and utility thereof.

It has for another of its objects the elimination of a number of operating cycles of the machine where so-called single card groups are tabulated; that is, groups of cards having but a single record card devoted to a particular classification.

In the statistical work handled by tabulating machines in general, the record cards are arranged in groups which are separately tabulated and the totals printed on a suitable report sheet. To effect this, the items carried by the individual cards of each group are entered into a single counter as the cards are successively analyzed. Upon a change in the group designation the machine enters upon a total printing and reset cycle during which the total of the group is read from the counter and the counter reset. This procedure is followed for every group regardless of the number of cards comprising it, so that where there is a so-called single-card group the single item is transferred from the card to a counter and from thence retransferred to the report sheet, all of which requires one machine cycle for counter entry and a second cycle for the total printing operation.

Where the number of single card groups is comparatively large it is obvious that the efficient operation of the machine is considerably lessened, due to the double cycles necessary to record single group items. It is accordingly proposed to eliminate the entry of single-card group items and the additional operating cycle necessary to total print the same by printing the item directly from the card in a single cycle of operation. The item may still be entered into a counter for major totaling purposes.

This result is achieved by permitting the printing mechanism to operate and by disabling the automatic group control mechanism during the analysis of single-card groups. Each multiple-card group will be preceded by a so-called group signal card whose advent will cause interruption of the printing operation and the separate accumulation of the items contained in such group. The group signal card will also call the automatic control mechanism into operation to determine the end of the group and to initiate a total printing and resetting operation wherein the group total may be printed.

A further object of the invention is to provide paper spacing control mechanism to permit printing of successive items from several independent sources on successive printing lines of the invoice or report sheet.

A still further object resides in the provision of a novel sheet feeding device incorporating therein head spacing, line finding and machine control devices which automatically cause cessation of machine operation upon the entry of a predetermined number of items on the invoice and the automatic resumption of tabulating upon insertion of a new invoice.

Various other objects and advantages of our invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a central section of the printing mechanism of the machine.

Fig. 1a is a detail of a counter reset selecting device.

Fig. 2 is a detail of a hammer locking lever.

Fig. 3 is a central section of an accumulator.

Fig. 4 is a detail of the operating linkage for the multicontact controlling bail of Fig. 3.

Fig. 5 is a detail of certain contact controlling mechanism.

Fig. 6 is a plan detail of the accumulator read-out mechanism.

Fig. 7 is a detail of a read-out emitter and impulse distributor.

Fig. 8 is a section taken on line 8—8 of Fig. 7.

Fig. 9 is a detail of the head spacing control mechanism.

Fig. 10 is a detail of the paper spacing control mechanism.

Fig. 11 is a further detail of parts shown in Fig. 9.

Fig. 12 is a view showing the arrangement of the various types of record cards as they are arranged to control the preparation of an invoice.

Fig. 13 is a detail of a major total control card.

Fig. 14 shows several sheets of an invoice as prepared by the machine.

Figure 16:
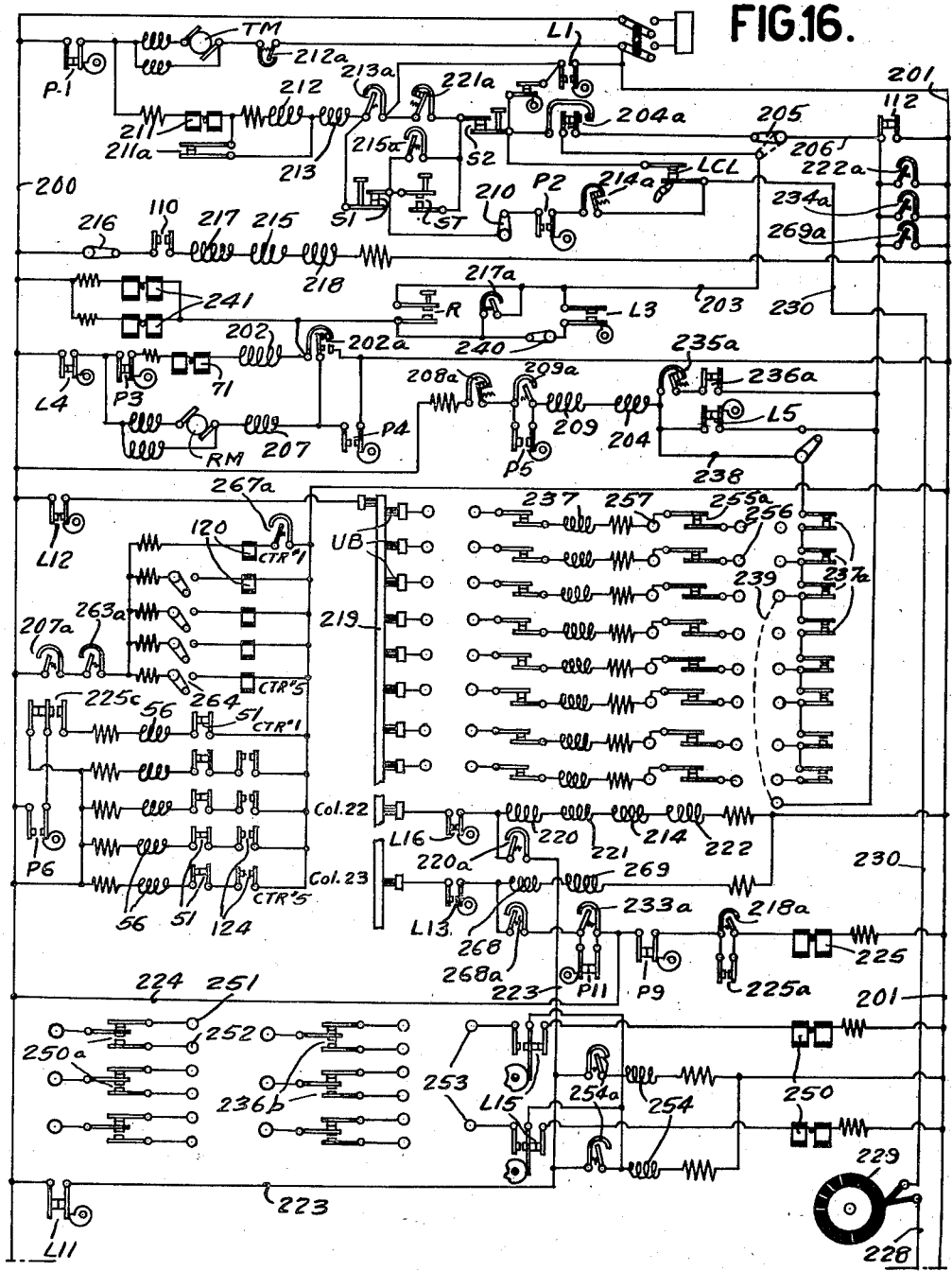
Figure 17:
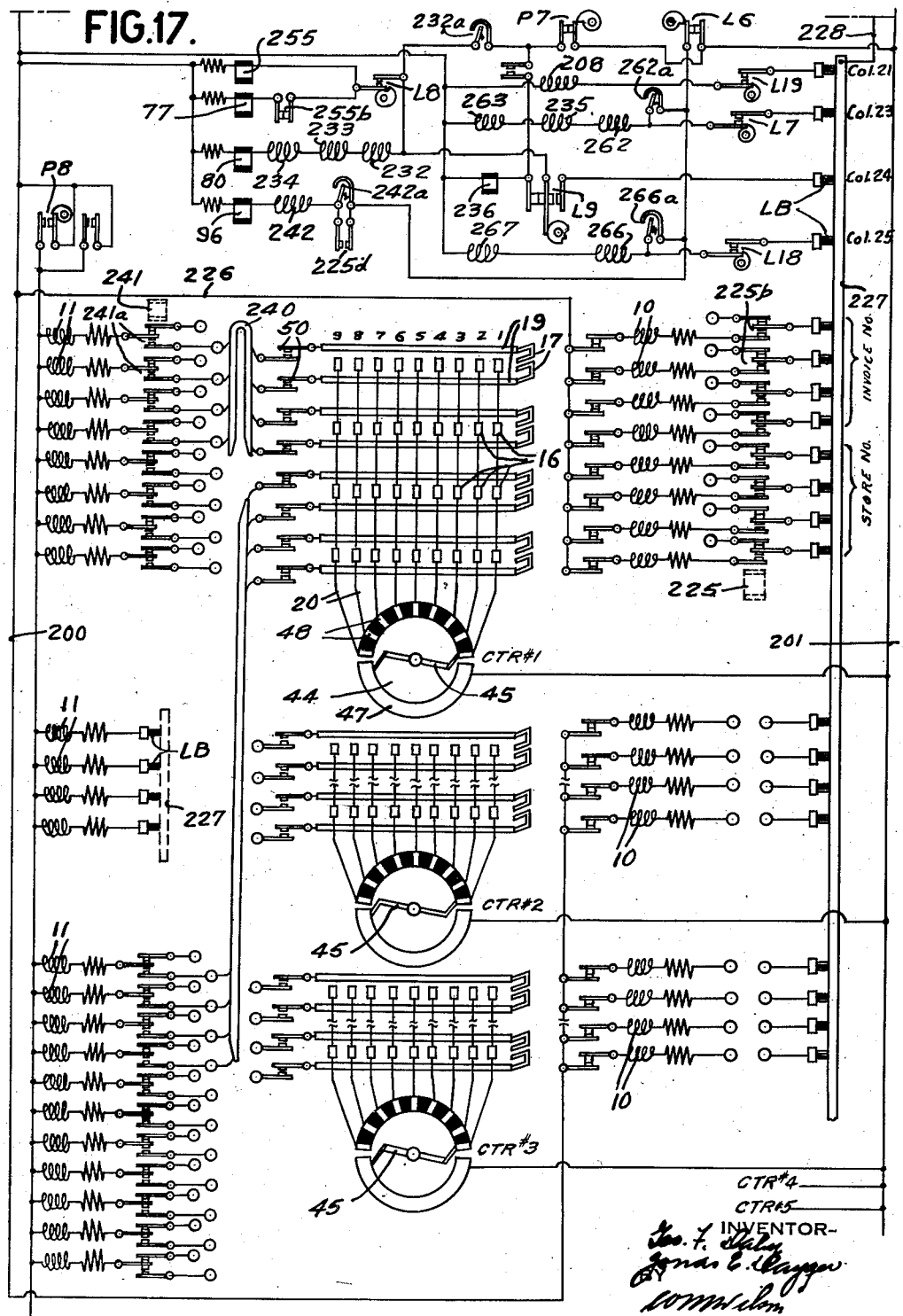

Figs. 16 and 17 taken together form a complete wiring diagram of the electric circuits of the machine.

Figure 18:
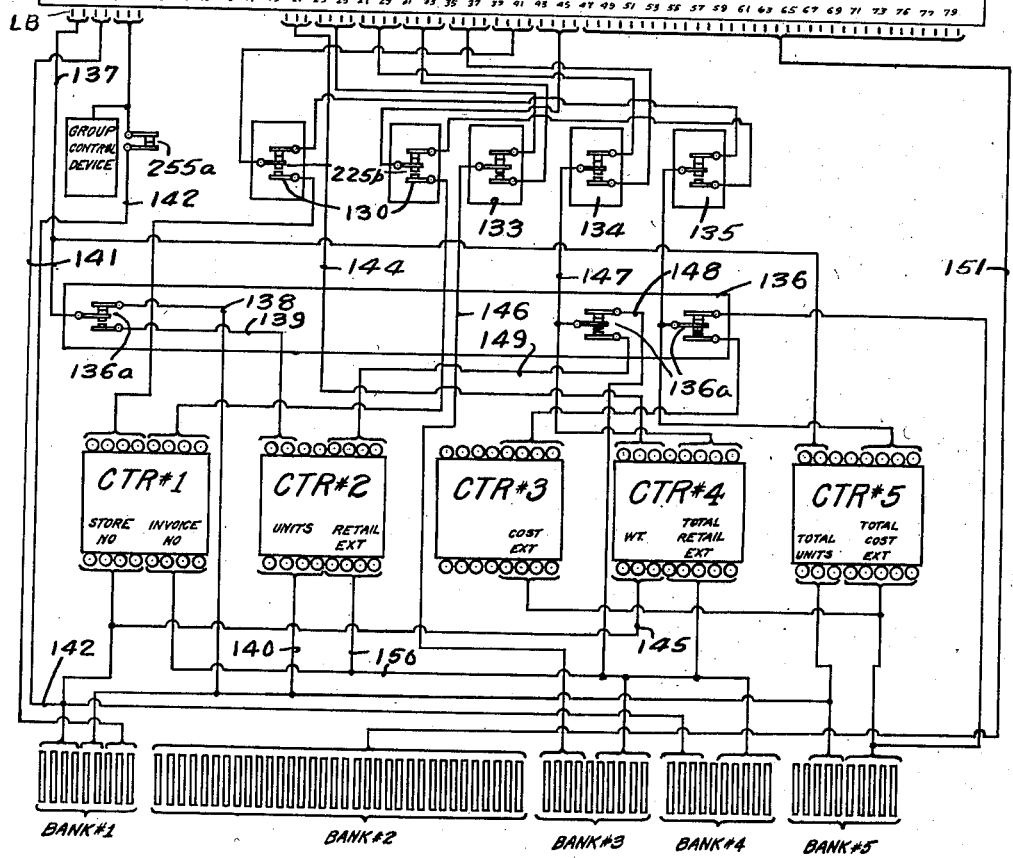

Fig. 18 is a diagrammatic view of the plugging connections.

In order that the detail description may be followed to better advantage, a general statement will be herein given of the operation of the machine in connection with a specific application and the system of operation will be described as being applied to a mercantile warehouse invoicing system, but it is understood that the invention may with equal facility be used in any other commercial establishment and in many other relations.

In certain chain store systems where goods are stored in central warehouses, shipments are made from time to time to the branch stores and an invoice of each shipment is prepared to correspond to the articles so shipped. Several kinds of cards are used in preparing these invoices. An "address" card as in Fig. 12 bears store identifying data such as the address of the receiving branch and its number. This card is used to control listing on the first printing line of the invoice (Fig. 14). Some of the data is duplicated on the right of the sheet which may later be severed to provide duplicate records, one to be retained at the warehouse and the other to accompany the shipment.

A second type of card is an "invoice number" card which is inserted immediately following the address card and is perforated to represent some particular invoice number. This number is printed under control of the card on the same line as the address and is also entered together with the store number on the address card into a storage device or indicating counter from whence printing may be controlled to repeat the store number and invoice number at the head of each separate sheet included in the complete invoice.

A third kind of card is a detail card bearing data concerning separate items or units such as description of the article, code number, retail price, retail and cost extension, weight, contacts, size, etc. In printing the name of the commodity and its description, combination characters are used and phonetic spelling is employed to best utilize the number of characters to which a single hole arrangement is limited. An inspection of Fig. 18 will disclose such combinational characters are EF, MN, WN, LI, CG, PR, UV, QO, XY, JT, etc.

Preceding each commodity group of detail cards is inserted a so-called "group signal" card to distinguish that group from those comprising but a single card. This card bears a single perforation in a particular index point position and controls machine operation therethrough.

The fifth type of card is a "sheet card" which may be inserted after the last card which is to print on a particular sheet. This card will alter the operation of the machine to permit entry of the next sheet and will also cause the printing of the store number and invoice number at the head of the new sheet together with such designating data as "second floor" which is derived from the card itself.

A sixth type of card called a "final total" card is usually the last card for any invoice and it contains perforations in certain predetermined locations. Its function is to initiate a total printing operation of the machine during which totals may be printed upon the sheet and the counters subsequently zeroized.

A seventh type of card (Fig. 13) is a "major total" card which may be inserted at any point and which through special perforations therein will initiate a total printing operation to indicate the totals on the sheet. The counters will be cleared as when totals are taken under control of the "final total" card, except that the so-called indicating counter will not be cleared.

In operation the "address" card of a floor group is fed through the machine and the address data thereon transferred to the first line of the invoice while other data such as "store number" is entered into a so-called indicating counter. Paper spacing is then automatically suppressed as the next or "invoice card" is analyzed and the data thereon also entered into an indicating counter. An automatically initiated total printing cycle is thereafter initiated during which the "store number" and "invoice number" are printed under control of the indicating counter adjacent to the address. The data remains in this counter for repetition printing on subsequent sheets of the invoice.

Tabulating and card feeding operations then automatically resume and the items on the following detail cards are successively listed and certain data entered into appropriate accumulators. Where a group signal card indicates the advent of a multi-card group the data of the several cards is accumulated in a separate counter and only the total thereof printed on the invoice, the paper spacing meanwhile being delayed until such total printing has taken place.

At the end of a floor group the inserted sheet card will cause the machine to stop to permit insertion of a new sheet. Printing then takes place under control of the sheet card on the first line of the new sheet. The sheet is then double-spaced and the next floor group is similarly listed, the "sheet" card at the end thereof again stopping the machine. This printing and totaling of sub-groups continues until the last group has been listed whereupon the "final total" card at the end thereof will automatically initiate a total taking cycle wherein a final or grand total is printed and the accumulators and indicating counters zeroized. The machine then comes to rest to permit removal of the invoice and the insertion of a new sheet.

Each of the detail cards is provided with duplicate fields headed "Retail price", "District", "Store", "Retail exten." and "Cost exten." and the fields on the right are normally perforated with the appropriate data. Where the price of the article fluctuates or the "store number" is changed after the card has been prepared the new data is entered on the fields on the left and a special hole is punched in the "X" index point position of a predetermined column to indicate that the new data is to prevail. The "X" hole will cause the machine to sense the data on the left and disregard that on the right. This arrangement obviates the necessity of preparing an entire new detail card when a price fluctuation occurs in a commodity, or a store number is changed.

The improvements have been shown as applied to an electrical tabulator of the type disclosed in Patent No. 1,762,145, issued to Daly and Page. Each counter wheel of the accumulator may be provided with a commutator having a segment corresponding to each significant figure indication of the counter wheel. A brush may be geared to the counter wheel so that it always rests on the commutator segment corresponding to the digit reading of the wheel. Each of these brushes may be connected to a printer magnet to select the proper type for printing during total taking.

An impulse emitter is provided for each accumulator bank coordinated with nine separate lines at a point in the machine operation corresponding to the digit value which they represent. Thus the "9" line receives an impulse timed to select a nine for printing, the "8" line receives an impulse timed to select the eight type for printing and so on. All the commutator segments of an accumulator bank corresponding to the "9" position of the counter wheels are connected to the "9" impulse line from the emitter corresponding to that bank. All the "8" segments are likewise connected with the "8" line and so on.

The diagram in Figs. 16 and 17 illustrates the wiring of the complete machine. During listing and adding operations the machine is driven by a tabulating motor TM controlled by a group of cam and relay controlled circuits to be traced later and during total taking operations the machine is driven by a reset motor RM controlled in a manner to be explained. When the tabulating motor TM is in operation it feeds the perforated tabulating cards, bearing differentially arranged index points representing digits, first beneath the upper analyzing brushes UB and one machine cycle later beneath the lower analyzing brushes LB.

As the perforated cards pass the lower brushes their index points instantaneously close circuits through the proper lower analyzing brushes LB to energize counter magnets 10 or printer magnets 11 or both together. As usual the timed energizations of these magnets control mechanism for entering the data corresponding to the card reading on the counter wheels or stopping the type bar at the corresponding printing position. In this fashion the accumulated items may be listed. These functions do not enter specifically into the present invention and will not be described in detail as they are well understood and fully described in the patent previously mentioned.

Referring now to Fig. 3, the counter wheels are represented by gears 12 driven from a shaft 13 under control of the counter magnets 10 as previously stated. As usual indicating wheels are provided at 14 fixed to the counter wheels so that data entered on the counter wheels may be visually indicated.

The total taking mechanism shown in the upper part of Fig. 3 and in Fig. 6 consists of a commutator 15 provided with segments 16 corresponding in number and position to the several digit indicating positions of the counter wheel 12. A brush structure 17 is mounted on a gear 18 driven by the gear which drives the counter wheel 12 so that the brush structure is angularly displaced according to the reading on the counter wheel. The structure carries two brushes, one of which engages the segments 16 and the other of which engages a common segmental conductor 19 whose surface corresponds to the configuration of the commutator. All of the segments 16 corresponding to the same digit are connected to a common conducting bar 20 whereby all the "9" segments are in multiple, all the "8" segments are in multiple, and so on.

In Fig. 1 is shown the printing mechanism through which the type bar 21 is positioned relatively to the platen 22 to bring the proper type into printing position opposite the platen. The total shaft 23 driven by the reset motor RM is provided with a cam 24 cooperating with a roller 25 carried on arm 26 freely rotatable on shaft 27. As the cam rotates, arm 26 rocks clockwise and a lug 29 cooperating with an arm 30 fixed to shaft 27 also rocks clockwise. Arms 31 also fixed to shaft 27 are linked to printing crosshead 32 which serves to raise the type bar 21 in synchronism with the total taking operation so that the type successively pass printing position opposite platen 22. Owing to the spring operated scissors connections 33, however, the type bars 21 may be arrested in any printing position without interfering with the upward movement of crosshead 32.

During card feeding operations shaft 34 is driven by the tabulating motor TM (Fig. 16) and is provided with a box cam 35 cooperating with a follower arm 36 loosely mounted on shaft 27. This arm cooperates with an arm 37 secured to shaft 27. In this manner crosshead 32 is elevated during listing operations by cam 35 to bring the type successively to printing position in synchronism with the movement of the corresponding index point positions past the lower brushes.

The type bars are arrested under control of the printing magnets 11. When one of these is energized it attracts its armature 38 and pulls call wire 39 to the right thereby releasing a latch member 40 normally holding stop pawl 41. When the pawl 41 is so released it is spring operated to engage ratchet teeth 42 cut on the type bar 21 to prevent further upward movement of the type bar thus holding a particular type in printing position. Printing hammers 43 are subsequently tripped to impel the selected type against the platen 22.

The device for emitting the timed impulses synchronized with the movement of the type bars 21 to select the type for printing during a total taking operation is shown in Figs. 7 and 8. This consists of a number of individual commutators 44 located adjacent to the total shaft 23. A brush holder 45 is secured upon shaft 23 and insulated therefrom. The holder carries a plurality of brushes 46, one for each commutator, which receive current through a collector ring 47 integral with holder 45. Each commutator is provided with a plurality of contact segments 48, so spaced that the brush 46 reaches a segment 48 as the type corresponding to it on type bar 21 is passing printing position during a total printing cycle. Each commutator 44 is associated with a separate bank of accumulating elements and each segment 48 is electrically connected with the bars 20 connecting the common commutator segments 16 of Figs. 3 and 6.

Hence it will be understood that each set of commutator segments 16 in an accumulator bank receives a timed impulse at the time when the type corresponding to the segment is passing the printing line. In Fig. 17 these devices have been shown diagrammatically and their detailed functions will be traced in connection with the description of the circuit.

A circuit switching device is provided in Figs. 3 and 6 which is adapted to close the total printing circuits at the beginning of a total taking cycle of operations. This consists of a plurality of contacts 50 which may be wired in series with the circuits of printer magnets 11 (see Fig. 17). A normally closed contact 51 is also provided. A common bail 52 of insulating material is secured upon a shaft 53 which also carries a spring pressed latching arm 54 adapted to be latched in its clockwise position by an armature latch 55. In such latched position the bail 52 will hold contact 51 closed and contacts 50 open.

Energization of a magnet 56 will release arm 54 and the parts will assume a position wherein contacts 50 are closed and contact 51 is open. In Fig. 4, shaft 53 carries an arm 57 at its extremity which has an adjustable stud 58 in its free end in engagement with an arm of a lever 59 loosely pivoted at 60. The other arm of the lever cooperates with a cam 61 secured upon reset shaft 62. This shaft, as is fully explained in the patent referred to, is adapted to make a complete turn during the latter half of a total taking cycle of operations to zeroize the counters. At such time cam 61 will rock arm 57 through lever 59 to turn bail 52 in a clockwise direction whereupon latch 55 will engage and hold arm 54.

Figure 15:
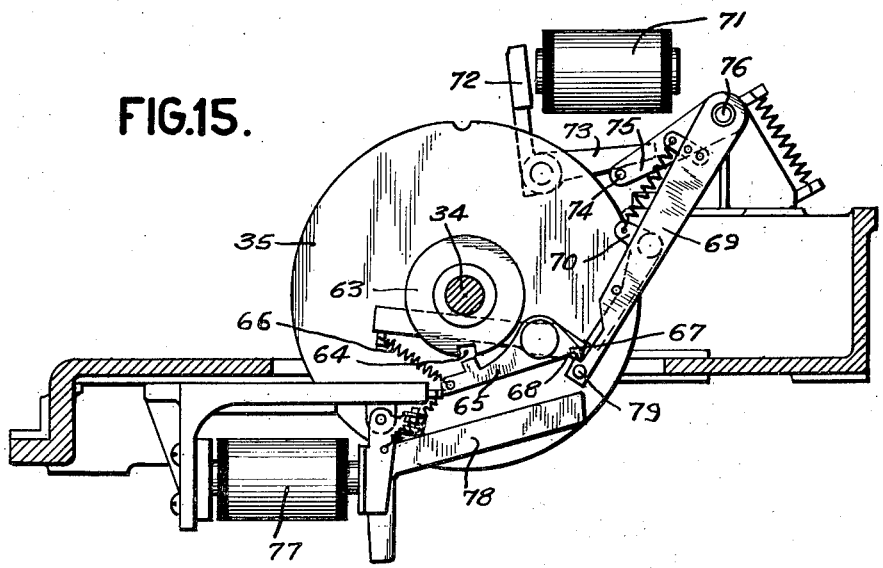
Fig. 15 is a position view of parts shown in Fig. 1.

Fixed to the listing cam shaft 34, adjacent to the listing cam 35 is a clutch disk 63 provided with a notch 64 (see also Fig. 15). Listing cam 35 is loose upon the shaft 34 and during listing operations this cam is clutched to the shaft by the means which are now to be described.

Pivoted upon the listing cam 35 is a clutch member 65 normally drawn into engagement with the disk 63 by means of a spring 66. The member 65 is provided with a tail 67 which is adapted to cooperate with a shoulder portion 68 upon a rocking lever 69. Lever 69 is also provided with the usual rebound latch 70. For normal listing operations lever 69 is in the position shown in Fig. 1. With the parts in this position member 65 is in engagement with notch 64 thus coupling the listing cam 35 to the shaft 34. In a manner more fully set forth in the patent referred to, the lever 69 may be held continuously in the position shown in Fig. 1. This is the position it occupies when the machine is set for straight listing followed by the taking of a total of the listed items. When the machine is set for tabulating, lever 69 is normally set in the position shown in Fig. 15 to hold member 65 out of engagement with disk 63. However, during a total taking operation the clutch is permitted to engage to drive cam 35 for a single revolution during which the group designation may be printed. To this end magnet 71 (Fig. 1) is energized during a total taking operation, actuating its armature 72 and an arm 73 integral therewith. Arm 73 engages a pin 74 in an arm 75 secured to rod 76 upon which is also secured lever 69. The consequent counterclockwise rocking of rod 76 will move lever 69 in the same direction, releasing member 65 for driving engagement with disk 63. Before a revolution of disk 63 is completed lever 69 will again swing to its "tabulating" position and member 65 will again be disengaged from its cooperating disk.

Having briefly described the previous construction, the modified construction of the present machine will now be described.

Suspended beneath the base of the printing mechanism is a magnet 77 which has a spring-pressed, pivoted armature latch 78 cooperating therewith which, when magnet 77 is deenergized, will have the end of one of its arms in the path of a pin 79 carried by lever 69.

With the machine set for "listing" lever 69 will, of course, be adjusted in position as in Fig. 1 and latch 78 will have no influence over it. But with the machine set for "tabulating" with lever 69 free to engage tail 67 of member 65 latch 78 may rock into position to hold lever 69 away from member 65.

Magnet 77 is normally deenergized for tabulating operations so that the parts occupy positions as in Fig. 1 and the list cam 35 will make one revolution for each card cycle. Magnet 77 may be deenergized while the parts are positioned as in Fig. 15, and it will be noted accordingly that latch 78 will contact the pin 79 on its underside so that latching of lever 69 will not be effected until the lever has been rocked in a counterclockwise direction to permit latch 78 to snap into latching position. As heretofore explained the cards fed through the machine may be arranged with both single-card groups and multiple-card groups, with a special group signal card preceding each multiple-card group. As the single card groups pass through the machine the data thereon will be directly listed, the listing cam being coupled to shaft 34 and lever 69 held out of engagement with the clutch member 23 by latch 78. The circuits involved in these operations will be explained later in connection with the wiring diagram.

*Paper-space control*

A paper space control device is provided to maintain a uniform spacing of the printed items some of which may be printed under direct listing conditions and others under counter control. A magnet 80 is provided (Fig. 10) whose armature 81 has an arm 82 to which is connected a link 83 extending to the paper space latch 84. As in previous machines latch 84 is adapted when the machine is set for tabulating to hold structure 85, which comprises several connected members, in the position shown in Fig. 10 by engagement with a block 86 riveted to one of the members of the structure. Magnet 80 is adapted when energized to hold latch 84 against block 86 and the controlling circuit therefor will be traced later.

A link 87 attached to structure 85 connects at its upper end to a ratchet and pawl paper feed device of the usual type mounted upon the shaft of the printing platen. Structure 85 may be rocked about its pivot 88 during listing operations through an arm 89 secured to shaft 27 (see also Fig. 1) which rocks whenever the type bars are elevated.

In the upper part of Fig. 10 the usual double-space pawl shield 93 is shown as having connection with a lever 94 pivoted at 95. A magnet 96 is adapted upon energization to rock its armature 97 counterclockwise whereupon a stud 98 in its free end will engage an arm of lever 94, rocking the latter in the same direction. Shield 93 will then be in position to permit the feeding pawl 99 to engage its ratchet for increased paper spacing.

Figs. 9 and 11 show the automatic line finding and quick insert device. Platen 22 has fixed to one end of its shaft a ratchet 100 with which a pawl 101 carried by a disk 102 loose on the platen shaft cooperates. A spring 103 serves to keep the parts in engagement. Disk 102 is secured to a gear 104 also loose on the shaft and which meshes with a rack 105 mounted for horizontal movement on the frame of the machine. A finger-piece 106 when drawn toward the left in Fig. 9 will advance rack 105 and turn gear 104 and attached disk 102 in a clockwise direction. Pawl 101 will thereupon turn ratchet 100 to cause the platen to advance the record sheet. Rack 105 may be advanced until a member 107 adjustably carried thereby engages a serrated disk 108 fixed on the platen shaft. Member 107 is usually adjusted in accordance with the length of the report sheet. Movement of rack 105 toward the right will return disk 102 and gear 104 to the position shown, leaving platen 22 in its advanced position where it is retained by the usual detenting devices. When the rack is returned a pin 109 therein will engage and close a pair of contacts 110.

These contacts are disposed in the starting circuits of the machine and upon closure by pin 109 will cause card feeding and printing operations to resume during which operations the platen 22 is advanced as explained. Such advance will also turn ratchet 100 in a clockwise direction as viewed in Fig. 9 and by virtue of the frictional contact between ratchet 100 and pawl 101 induced by spring 103, the pawl and its associated disk 102 will also turn in a clockwise direction to thereby advance rack 105 step by step as the platen is spaced. The frictional resistance of rack 105 and related tension of spring 103, whereas the resistance of the platen itself when held by its detenting device will hold the platen against the effort of 101 to move it as the latter is turned counter-clockwise as explained above. Slidably adjustable in a slot in member 107 is a member 111 which has teeth cut in an upward extension thereof which engage the teeth cut on the underside of rack 105. Member 111 lies in the plane of a contact 112 and is adapted upon engagement with a block 113 carried by a blade thereof to open the contact. This contact is located in the stop circuits of the machine and upon opening will cause interruption of machine operation. The functioning of the device will now be briefly reviewed. With member 107 adjusted in accordance with the length of sheet desired and member 111 set in accordance with the scale indicated on rack 105 to the number of lines to be printed on each sheet; finger-piece 106 is drawn forward and while in such position the record strip is adjusted for printing on the first line thereof. The finger-piece is then moved back while the record strip remains as adjusted. The consequent closure of contact 110 will institute printing operations during which rack 105 will advance a distance proportional to the advance of the record strip. After a predetermined number of entries have been made member 111 will open contact 112 to stop the machine. At this point the rack 105 may not have been completely advanced. The operator will then advance the rack to its limit and this movement will advance the record strip to the first line of the next invoice, skipping the remainder of the first sheet and also the head space of the following sheet.

It will be understood that the sheets mentioned are part of a continuous strip and are perforated for the purpose of separation after the printing operations are complete.

In Fig. 1a is shown a magnet device for selectively coupling a counter to the reset shaft for a resetting operation of the counter. 115 represents the usual gear carried by the reset shaft 116 which drives the index wheel shaft of the counter for resetting purposes. Gear 115 is loose on shaft 116 and is provided with a hole 117 into which a pin 118 carried by sleeve 119 is adapted to be projected. The sleeve is slidably keyed on shaft 116 and is adapted upon energization of magnet 120 to be moved to the right through the medium of armature 121 and sliding plate 122 to engage gear 115. Shaft 116 and gear 115 are stationary at the time of energization of magnet 120 with pin 118 in alinement with opening 117. Movement of sleeve 119 will rock bell crank 123 to close contacts 124. Sleeve 119 may also be shifted manually and restrained in shifted position by means of bayonet slot 125 in the manner well known in this type of machine so that gear 115 is continuously connected to shaft 116.

Hammer locks 126 (Figs. 1 and 2) are provided for individually locking type hammers 43 against operation. They are pivoted at 127 and extend above the casing of the printing mechanism for ready access. A spring-pressed detent 128 will hold lock 126 in its neutral position of Fig. 1 or in its locking position of Fig. 2.

Wiring diagram

The electric circuits will now be explained in detail with particular reference to the preparation of an invoice consisting of two separable sheets such as shown in Fig. 14. The record cards will previously have been arranged as in Fig. 12 with an "address" card followed by an "invoice" card heading the entire group of cards. The several "detail" or item cards then follow with a "group signal" card placed before the multiple-card groups of detail cards.

A "sheet" card is inserted after the last detail card of a floor or sheet group after which the detail cards related to the next floor or sheet group are placed in succession. Finally a "final total" card completes the arrangement.

Plugging connections

Before describing the electric circuits in detail the plugging arrangement as shown diagrammatically in Fig. 18 will be explained. The lower brushes LB have been shown adjacent to the columns of the record card with which they cooperate. The type bar positions are shown on the lower part of the drawing and are labelled "Bank #1" to "Bank #5". The several counters are also diagrammatically represented and labelled "CTR#1" to "CTR#5". Each group of connecting wires associated with the multi-column fields of the record card are represented by single lines. Several multi-contact relays are indicated at 130, 133, 134, 135, and 136. Each relay comprises a plurality of contacts of which there is one for each individual connection. In the diagram of Fig. 18, however, a single contact is shown.

Columns 1 and 2 of the detail card are shown connected by a line 137 to a pair of contacts 136a of relay 136 through the upper contact of which a line 138 extends and branches to type positions in bank #1 and bank #5. This connection permits printing of the "quantity" in these banks directly from the card. The presence of a group signal card preceding a detail card will cause multi-contact relay 136 to cause the opening of its upper contacts 136a and closure of the lower so that the line 137 will thereafter connect the brushes of the first two columns to counter #2 through a line 139 so that the "quantity" contained on the several cards of the group sensed may be accumulated, the total thereof being printed in banks #1 and #5 through a line 140.

The brushes of columns #3 and #4 are connected through a line 141 to bank #1 through which the printing of the "kind of package" is controlled.

Columns 5, 6, and 7 contain the code number and these columns are connected to the group control device for determining the end of the classification. These brushes are further connected through so-called group indicating contacts 255a and a line 142 to bank #1 and bank #4.

The brushes which read columns 8 to 19 are not used in preparing the invoice under consideration and are accordingly not plug connected.

Columns 20, 21, 22 are connected through a line 144 to counter #4 in which the total weight of the shipment may be accumulated. This counter will print the weight in bank #1 and bank #4 as indicated by line 145 extending between the two.

Columns 23 to 26 are connected to the upper contacts of relay 133 while columns 31 to 34 are connected to the lower contacts of relay 133. It may here be mentioned that each of the detail cards is provided with duplicate fields for the district number, store number, retail and cost extensions, one of which fields is normally perforated with the current data. Where the price of the article fluctuates after the card has been prepared, the new data is entered in the second field and a special hole is punched in the X or 11 index point position of a predetermined column usually the first column of the second field to indicate that the new data is to prevail. The X hole will cause the machine to sense the data in the later punched field and to disregard that in the other. A change in district or store number may similarly be effected. This arrangement obviates the necessity of preparing an entire new detail card when a store number is changed or a price fluctuation occurs in a commodity. In the card of Fig. 18 a change in retail price has been indicated in columns 31 to 34 and the X position of column 31 has been perforated to indicate this change. This X perforation in a manner to be more fully explained in connection with the main wiring diagram will cause the lower contacts of relay 133 to close and connect these columns through a line 146 to bank #3 for printing of the retail unit price. With the upper contacts of relay 133 closed, printing in this section of bank #3 will be controlled by the data perforated in columns 23 to 26.

Columns 27 to 30 are connected to the upper contacts of relay 134 while columns 35 to 38 are connected to the lower contacts.

A line 147 will control the entry from either of these fields, as explained, into counter #4 and a branch thereof extending through the upper blade of a contact 136a of relay 136 to a line 148 will control printing in banks #3 and #4. Shifting of contacts of relay 136 under control of a group signal card will disconnect line 148 and through the lower contact of relay 136 and a line 149 will permit entry of the data from several cards of a group into counter #2 for obtaining the total for the group which will be entered into banks #3 and #4 through a line 150. The several items may also be entered into counter #4 through a line 149a for grand total taking operations.

Columns 39 to 42 and 43 to 46 will in the same manner be connected for printing in bank #5, sub-totaling in counter #3, and grand total accumulating in counter #5. These columns are connected first to contacts 225b of relays 130. The lower blades of these contacts are closed during the analysis of the "address" and "invoice" cards so that the "store" number may be entered into the left of CTR#1 from columns 39—42 of the address card and the "invoice" number from columns 43—46 of the "invoice" card. At other times upper contacts 225b are closed to connect these card columns to relay 135 for selective entry of the "cost extension".

Columns 47 to 80 are connected through a line 151 to bank #2 for printing the contents and size and alphabetical description of the commodity.

Preliminary reset cycle

The cards arranged in the proper order, having been placed in the supply hopper, a preliminary reset cycle must first be taken to prepare the control circuits of the machine. This cycle may either be initiated by depression of reset key R (Fig. 16) or by the closure of contact 110 which is effected by advancing the line spacing rack 105 of Fig. 9.

The circuit established by the closure of contact R may be traced from the left side of line 200, through cam contacts L4 and P3, reset clutch magnet 71, relay coil 202, contact R, wire 203, inner motor control relay points 204a, switch 205, wire 206, carriage stop contacts 112 to right side of line 201.

Energization of relay 202 will close its points 202a to complete the reset motor circuit from line 200, contact L4, reset motor RM, relay 207, relay points 202a to line 201. This circuit sets the resetting mechanism of the machine in operation during which the several P cams operate. During this operation, cam contact P5 closes to establish a circuit from line 200 closed, relay points 208a, cam contact P5, relay coils 209, 204, cam contact L5, contact 112 to line 201. Relay coil 209 by closing its points 209a sets up a holding circuit across contact P5 to maintain relay 204 energized, and its outer points 204a closed. Closure of contacts P4 will keep the motor RM in operation and opening of these contacts after contact P3 has opened will terminate the reset operation.

The circuit which may be completed by closure of contact 110 extends from line 200, switch 216, contact 110, relay coils 217, 215 and 218, to line 201. Coil 217 will close its points 217a wired in parallel with reset key R, thus initiating a reset cycle of operations in the same manner as though reset key R were depressed. Relay coil 215 will close its points 215a in the tabulating clutch circuit to permit the automatic initiation of a tabulating cycle if the reset cycle has been initiated by closure of contact 110.

First tabulating cycle

Toward the end of the preliminary reset cycle provided contact 110 is held closed, a circuit will immediately be completed to initiate tabulating operations. This circuit may be traced from line 200, cam contact P1 (now closed), clutch magnet 211, clutch magnet contacts 211a, relay 213, stop key S1, relay points 215a, stop key S2, outer relay points 204a (now closed), switch 205 to right side of line 201 as before.

This circuit will only be completed if the previous reset cycle has been initiated by closure of contacts 110 since at this time there will not be a card under the analyzing brushes. Energization of clutch magnets 211 will cause opening of associated contacts 211a, thus including relay coil 212 in the circuit of the clutch magnet 211. Relay 212 will close its points 212a, thus establishing the circuit of tabulating motor TM from line 200, contact P1, motor TM, relay points 212a to line 201. With the motor TM in operation, the machine will commence tabulating operations during the first cycle of which the first card of the stack, namely, the "address" card, will be advanced from the supply hopper. Since at this time no cards are either at the upper or lower brushes, the automatic control mechanism will function in the well known manner to keep the motor circuit in operation for another cycle. Toward the end of this cycle of operations, a circuit will be completed through the upper brush which traverses the twenty-second column of the record cards. It will be understood that at this time no cards are in transit past the brushes. The circuit may be traced as follows: from line 200, through cam contact L12, contact roll 219, brush UB in the twenty-second column position, cam contact L16 adapted to close momentarily at the "X" position, stop control relay coil 220, stop relay 221, relay coils 214 and 222 back to line 201.

Relay coil 220 will set up a stick circuit through its points 220a connecting the several relay coils through a wire 223 and cam contact L11 to left side of line 200. It may be here mentioned that during the preceding tabulating cycle the paper feed rack 105 advances to permit the opening of contacts 110, thereby de-energizing the several relays in series therewith. The consequent opening of points 215a will cause the tabulating clutch circuit to extend parallelly through cam contact L1 and stop relay points 221a. The energization of relay coil 221 under control of the circuit through brush UB in column 22 of the card will open the points 221a so that the clutch magnet circuit may be broken at the proper time by cam contacts L1 to bring the machine to rest.

*Address card cycles*

Closure of carriage start contacts 110 at this time will complete the circuit through clutch magnet 211 and motor TM to initiate a cycle of operations during which the address card will be moved past and sensed by the upper analyzing brushes UB. Since the address card is perforated in the "X" position of column 22, the circuit for this position will be completed as traced above and the machine again brought to rest following this cycle, contacts 110 being re-opened meanwhile. At this point, the invoice sheet may be inserted in the printing carriage and positioned so that the first entry line will be two spaces below the actual printing position.

Rack 105 may now be again moved to close contact 110, thus again energizing coil 215, causing closure of points 215a, and initiating a new cycle of tabulating operations. Since at this time as was before the case at the previous closure of contacts 110, inner relay points 204a are open, the energization of relay coil 217 together with coil 215 will be ineffective to complete the previously traced reset cycle circuit.

At the same time, energization of relay coil 218 will close its points 218a to set up a circuit from line 200, wire 224, contact P9, relay points 218a, multi-contact relay 225 to line 201. This circuit through multi-contact relay 225 is held through contact 225a, closed thereby, which contact is connected in parallel with relay points 218a. The circuit is completed before the address card passes the lower brushes. The multi-contact relay 225 also causes shifting of its contacts 225b (Fig. 17) from the position shown in the diagram. These contacts are those which have been generally designated as 130 in Fig. 18 and are adapted when they shift to connect the lower brushes LB with the magnets 10 of indicating counter #1, so that during the transit of the address card past the lower brushes, circuits may be completed from line 200, wire 226, counter magnets 10, lower contacts 225b, brushes in columns 39 to 42 which read the store number, lower brush contact roller 227, wire 228, impulse distributor 229 (Fig. 16), wire 230, lower card lever contact LCL, outer relay points 204a (closed at this time) to line 201 as before. The store number may be entered from the address card into one section of the indicating counter. The brushes which sense the columns of the card, 47 to 80, devoted to the actual address are wired directly to the printing magnets 11 of printing bank #2 so that the address can be directly listed on the record sheet during the movement of the address card past the lower brushes. As the "X" position of the twenty-fourth column of the "address" card is sensed, a circuit will be completed through the perforation at such point as follows: from impulse distributor 229 (Fig. 16), lower brush contact roll 227 (Fig. 17), lower brush LB of column 24, right contact L9 (timed to close at this point) relay coils 232, 233 and 234, paper feed latch magnet 80, to line 200. Energization of relay coil 232 will close its points 232a to establish a holding circuit through cam contacts P7 which will be maintained until the contact opens during a reset cycle of operations.

Magnet 80 is energized after the record sheet has been advanced to receive the printing of the address on the first line, at which time the parts will be in position as shown in Fig. 10. Further paper spacing operations will thereafter be suppressed until magnet 80 is again de-energized.

*Invoice card cycle*

The motor control circuit for relay 204 is maintained at this time through a circuit from line 200, relay points 208a, 209a (Fig. 16), relay coil 209, motor control relay 204, closed relay points 235a, contact points 236a of a multi-contact relay 236, contact 112 to line 201. This circuit will keep motor TM in operation so that the invoice card following the address card will now pass the lower brushes. At this time, multi-contact relay 225 is still energized, causing the lower brushes of columns 43 to 46, which read the invoice number, to be connected with the magnets 10 of indicating counter #1, into which the data from the card will be entered in other columns of the counter than those which received the "store number". Toward the end of the previous address card cycle, closure of left cam contacts L9 (Fig. 17) included the multi-contact relay 236 in the holding circuit of paper feed latch magnet 80 and in parallel therewith from closed relay points 232a, left cam contacts L9, relay 236, to line 200. Relay coil 236 thus opens its points 236a (Fig. 16) in the control circuit. Contacts 237a are the usual automatic control contacts controlled by magnets 237 which magnets may be connected in series between the upper and lower brushes. In this case, the magnets are so connected in the columns in which the code number is perforated viz., columns 5—7. If similarly perforated cards pass the two sets of brushes simultaneously, circuits will be completed in the well known manner to close related relay contacts 237a, which will maintain the circuit through motor control relay 204 during the momentary opening of cam contact L5, through a wire 238, the first three contacts 237a, shunt plug connection 239, contact 112 to line 201.

Since the invoice card has no code number perforations therein while the following card may or may not have such perforations, contacts 237a will obviously not be closed since no series circuit can be completed through the two cards which are passing the lower and upper brushes respectively. Since contact 236a is also open, the opening of cam contact L5 during the latter part of the invoice card cycle will cause motor control relay 204 to become de-energized permitting opening of outer relay points 204a, which will interrupt the operation of the tabulating motor and closure of inner relay points 204a to initiate an automatic reset cycle, which will now follow, providing auto reset switch 240 is closed.

Reset cycle

Closure of cam contact L3 just before tabulating operations are stopped will complete a circuit from line 200, contacts L4 and P3, reset magnet 71, relay coil 202, auto reset switch 240, cam contact L3, wire 203, inner relay points 204a, switch 205, wire 206, contact 112 to line 201. This circuit will initiate a reset cycle of operations through further circuits already traced. During this cycle of operations, the store and invoice numbers will be printed on the same line of the record sheet as the address. Before the actual printing circuits can be completed, contacts 50 associated with the read out mechanism of the indicating counter #1 (Fig. 17) must be closed. A contact 225c (Fig. 16) controlled by multi-contact relay 225 is adapted to have its right contact points closed during the period that magnet 225 remains energized so that upon the closure of cam contact P6 soon after the commencement of the reset cycle in question, a circuit will be completed from line 200, cam contact P6, right contact 225c, magnet 56 of CTR#1, contact 51, to line 201. Magnet 56 as explained in connection with Fig. 3, is adapted upon energization to permit closure of its associated contacts 50 (Fig. 17) and opening of contact 51 which latter contact simultaneously interrupts the circuit to the magnet itself.

Impulse emitter 44 associated with the indicating counter #1 is adapted to emit impulses through its segments 48 as the type bars are moving to printing position so that a succession of circuits may be completed from line 201, common ring 47, brush structure 45, segments 48 in succession and through contact strips 20 to the several groups of segments 16 in succession. From thence through brushes 17, at times depending upon the setting of the brushes, to common conductors 19, contacts 50, cables 240, lower blades of contacts 241a (now closed), print magnets 11, cam contact P8 to line 200.

The cables 240 connect the read out device of the counter to the proper columns for printing. Contacts 241a are shifted to close their lower blades during reset operations under control of magnets 241, wired in parallel with the reset clutch magnet 71 (Fig. 16). The circuit for these magnets is completed concurrently with the energization of clutch magnet 71 and is held in the same manner through relay points 202a. During this reset cycle, cam contact P7 will open to permit de-energization of paper feed latch magnet 80, permitting the feed pawl to move to position where it will be ready to advance the record sheet upon the next upward movement of the type bar crosshead. A contact 225d (Fig. 17) which is closed while its controlling relay 225 remains energized is adapted upon closure to complete a circuit through space magnet 96 from line 200, magnet 96, relay coil 242, contact 225d, cam contact L6, to line 201. This circuit was initially completed as an incident to the last manual starting operation and contact 225d has remained closed during the successive address card and invoice card cycles of operation. Space magnet 96 as explained in connection with Fig. 10 is adapted to move the shield 93 so that double spacing may be effected. Relay coil 242 provides a holding circuit for magnet 96 through its points 242a so that when contacts 225d open during the present reset operation, magnet 96 will remain energized at this time, since the cam contact L6 is closed.

This contact remains closed until after the next paper spacing operation so that the next entry on the record sheet will be double-spaced from the address line as shown in Fig. 14. During this reset cycle, the circuit through motor control relay 204 will again be set up and automatic starting will take place upon closure of contact P2 (Fig. 16). This circuit is as follows: line 200, magnet 211, coils 212, 213, key S1, switch 210, contact P2, relay points 214a, contact LCL, outer points 204a to line 201 as before.

Detail card listing cycle

The card following the invoice card will be a so-called single-card group consisting of a single (detail) card or it may be the group signal card which precedes a multiple-card group. The circuits involved in the analysis of the so-called single-card group will first be considered. The various lower brush positions which are not permanently wired to their related printing and adding mechanisms are connected by suitable plug connections to the printing banks or counters of the machine which are to receive the classified data carried by the detail card. These connections have been diagrammatically indicated in Fig. 18 and have not been repeated on the wiring diagram.

Several of the fields of the card are connected directly to the devices which they are to control, in the well known manner.

Class selection:

For those sections of the card from which it is desired to sense the data of either of a pair of similar fields, the plug connections are made first to a set of so-called class selection contacts and from thence to the printing or adding device as the case may require. Such contacts are shown at 250a (Fig. 16) and comprise an upper normally closed contact and a lower normally open contact.

The plug socket 251 of the upper contact is connected to the brush column of one of the pair of perforated fields and the plug socket 252 is connected to a corresponding column of the other field. Normally, the analyzing circuit will extend from the lower brushes through upper contact 250a and thence to the listing or adding device. When controlling is to be effected from the second field, a special perforation in the "X" index point position of the first column of such field (see Fig. 18) will cause contacts 250a to shift to their alternate position. The manner in which such shifting is controlled is as follows: A plug socket 253 may be connected to the upper brush of the column in which the special "X" perforation occurs so that as the card is traversing the upper brushes, a circuit will be completed from left side of line 200, through the selected brush and connecting plug wire to plug socket 253, then through left contact L15, which is adapted to make at this time, relay coil 254 and thence to line 201. Closure of points 254a will establish a stick circuit through the coil, through wire 223 and cam contact L11, so that on the subsequent closure of right contact L15, a circuit may be completed from line 200, cam contact L11, wire 223, relay points 254a, right contact L15, class selection relay coil 250 to line 201. Relay 250 will remain energized while the card is passing the lower brushes, thus holding its related contacts 250a with their lower blades closed to permit entry of items from the "X" punched field and suppression of entries from the other field.

*Group signal card cycle*

As has already been pointed out, a group signal card is placed before a minor group of cards and its function is to cause the data on the cards of the group to be summarized and only the total thereof to be printed on the record sheet. In connection with the entry of the total of the group, it is also desirable to indicate the code number of the group and other data common to all of the cards of that group. For this purpose, the usual group indicating contacts 255a (Fig. 16) are provided (see also Fig. 5).

The manner of operation of these contacts is fully shown and described in Patent No. 1,822,594, issued September 8, 1931 to C. D. Lake and will be but briefly reviewed here. The columns of the card from which it is desired to group indicate, are wired through sockets 256 and sockets 257, continuing the circuit to the listing bank in which the data is to be entered. Contacts 255a are adapted to be closed during the sensing of the first card of the group and are automatically opened thereafter to prevent further entries from the same fields. The group signal card is provided with a special perforation in the "X" position of column 24 thereof which as this card passes the lower brushes, will complete the circuit already traced to energize group signal relay 236 and also paper feed latch magnet 80. During passage of this card past the lower brushes, the normal paper spacing operation will advance the record sheet to the next line for entry, at which point the paper feed latch will now hold it until the next following reset operation. Energization of relay magnet 236 will cause shifting of its related contacts 236b from the position shown on the diagram to open position. These contacts are shown at 136 in Fig. 18 and are adapted upon shifting to connect certain of the data fields of the record card to counters #2 and #3 for summarizing the cards of the group accompanying the group signal card.

*Multiple card group cycles*

As the first detail card of this group passes the lower brushes the data which is to be directly listed will be controlled through the now closed group indicating contacts 255a with the exception of the data in the alphabetical section of the card, which is directly and permanently wired to printing bank #2. The data to be accumulated is now entered into the proper counter through the lower contacts 236b.

As this card is passing the lower brushes, cam contact L8 (Fig. 17) will close momentarily to complete a circuit from line 200, group indicating magnet 255, cam contact L8, now closed, relay points 232a, cam contact P7 to line 201. A parallel circuit will also extend through magnet 77 and contact 225b. This will cause contacts 255a to open and prevent further listing circuits therethrough. Contact 255b (Fig. 17) opening with contacts 255a will break the circuit to listing-cam clutch latching magnet 77 after the latter has released the clutch latching lever to engage and stop further operation of the listing cam. Reengagement of the listing cam cannot now take place until a reset cycle of operations has taken place.

As explained in connection with Figs. 1 and 15, energization of magnet 77 will disconnect the listing cam from the listing shaft 34 to prevent further operation of the printing crosshead. At the end of this card cycle, the group indication will have been printed on the proper line and the paper spacing mechanism suppressed so that the next printing operation will effect printing on the same line.

Energization of group signal relay 236 by opening contact 236a (Fig. 16) will permit the group control contacts 237a to become effective for controlling further operations of the machine. As the several succeeding cards of the group now pass the brushes in succession, comparison between the two will take place in the well known manner and upon the advent of a card having a different control number, at the upper brushes the control circuit will be broken to de-energize motor control relay 204 which in the now familiar manner will cause initiation of a new total print and reset cycle of operations during which the data separately accumulated from the group will be printed and the counters zeroized. It will be understood that these counters which are accumulating the totals of the groups separately are connected to the reset mechanism in the usual manner so that resetting thereof will take place each total print and reset cycle.

During this cycle the cam contact P7 will operate to permit the unlatching of the paper feed mechanism so that it may be advanced to the next printing position. Also, in the manner fully explained and described in the Patent No. 1,822,594, referred to, the several group indicating contacts 255a and 255b will be mechanically latched in the position shown on the wiring diagram and in Fig. 5.

*Sheet card cycle*

The card following the last detail card of this group may either be a group signal card indicating that a new multiple card group is next in order; a single-card group; a sheet card; a major total card or a final total card. Assuming this next card to be a sheet card, the operations controlled thereby will now be explained. The principal function of the sheet card is to interrupt the machine operation so that a new record sheet may be brought into position. This card will also cause the repetition printing of the store and invoice number at the head of the new invoice or record sheet. The card is provided with an "X" punching in the twenty-second column which perforation is sensed by the upper analyzing brush UB as the card passes the upper brushes and the circuit therethrough, which has already been traced, will cause the machine to come to rest with the card about to pass the lower brushes. At this point the operator will move rack 105 (see Fig. 9) forward to advance the record strip so that the first line of the new sheet will be in printing position. Rack 105 is then moved back to the position shown in Fig. 9, causing closure of carriage start contact 110. The machine will now resume tabulating operations under control of the now familiar circuits and the sheet card will pass the lower brushes. Data perforated on the sheet card such as "Second floor" will be printed on the record sheet as the card passes the brushes. An "X" perforation in column 24 will energize the group signal relay 236 and the paper feed latch magnet 80 to prevent further paper spacing operations.

The further "X" perforation in column 21 of the card will complete a circuit from line 201, impulse distributor 229, "X" perforation in column 21, cam contact L19 (Fig. 17), relay coil 208 to line 200. Energization of relay coil 208 will open its points 208a in the automatic control circuit (Fig. 16) causing de-energization of motor control relay 204 and the consequent initiation of a total print cycle of operations during which the impulse emitter 44 associated with indicating counter #1 will emit impulses to the read out device of the counter to control printing of the store and invoice number in the proper columns on the record sheet on the same line with the entry made directly from the sheet card.

Following this total printing and reset cycle of operations, space control magnet 96 will remain energized for a sufficient period to cause double spacing of the record sheet in the manner above pointed out.

*Final total card cycle*

Following the sheet card, may be a succession of single card and multiple card groups which will control the operation of the machine for printing on the second sheet of the invoice in the same manner as explained in connection with the first sheet. The printing of several new sheets may thus be controlled by placing a sheet card at the head of each entire floor or sheet group of cards. A final total card placed as the last card of the entire stack will cause the printing of the totals standing in the several accumulators and the restoration of the indicating counter. As this card passes the lower brushes, an "X" perforation in column 23 will complete a circuit from line 201 to lower brush of column 23, cam contact L7, adapted to close momentarily at "X", relay coil 262, relay coils 235 and 263 to line 200. Energization of relay 235 will open its points 235a (Fig. 16) and since contacts 237a are also open at this time, the automatic control circuit will fail to be completed and the machine will automatically enter upon a total print and reset cycle of operations.

Closure of relay 262a (Fig. 17) will establish a holding circuit through coils 263 and 235, through the cam contact L6. Relay coil 263 is adapted to close its points 263a (Fig. 16) in series with relay points 207a whose controlling coil 207 is in series with the reset motor. Points 207a are adapted to be closed whenever the circuit is complete through motor RM so that at this time a circuit will be established from line 200, relay points 207a and 263a, through switches 264 and the zero button magnets 120 of counters #2 to #5. Energization of these magnets as has been explained heretofore will cause their associated counters to be connected to the reset shaft if they have not already been so connected by manual operation (see Fig. 1a).

Each magnet 120 will close its associated contact 124, permitting completion of a circuit from line 200, contact P6, left contacts 225c (now closed), magnets 56 of the associated counters, through contacts 51 and 124 to line 201. Energization of the several magnets 56 will cause closure of their associated contacts 50 which will connect the read out devices of the counters to the printing banks which they are to control during the current total printing cycle.

A special perforation in the "X" position of column 25 of this final total card will complete a circuit from the brush in this column through cam contact L18 (Fig. 17), relay coil 266, relay coil 267, to line 200. Coil 267 will close its points 267a (Fig. 16) so that the circuit through zero button magnets 120 will also extend parallelly through magnet 120 of the indicating counter #1 and thence through relay points 267a to line 201. With all of the counters now connected with the reset shaft, they will be concurrently restored to zero.

As this final total card passed the upper brushes, the perforation in the "X" position of column 23 completed a circuit from line 200, cam contact L12, upper brush of column 23, cam contact L13, relay coils 268, and 269, to line 201.

Closure of points 268a will establish a holding circuit from line 200, wire 224, cam contact P11, points 268a, coils 268 and 269, to line 201. This circuit is maintained until cam contact P11 opens during the ensuing reset cycle. Following the reset cycle, the machine will come to rest.

*Major total card cycle*

A major total card may be inserted at any convenient place in the stack of cards at which point it may be desirable to cause the printing of the totals from the several counters and the restoration of the counters. The card is "X" punched in column 23 and through circuits controlled by this perforation, will cause printing and resetting from all the counters of the machine with the exception of the indicating counter in the same manner as explained in connection with the final total card. This major total card, however, will not affect the indicating counter but will permit the data entered therein to remain so set.

*Automatic machine stop*

It has been shown how contact 112 may be opened after a predetermined number of lines have been printed upon the invoice. This contact is in series with the automatic control circuit and upon opening will break the circuit provided relay points 222a, 234a and 269a are also open at the time. These relay points serve to maintain the circuit under various circumstances to insure the completion of certain initiated operations.

The points 234a close whenever a group signal card is at the lower brushes. If at this time, due to the paper spacing action coincident with the transit of the group signal card past the brushes, stop contact 112 were to open the machine would stop with only the group indicating data of the minor group printed on the last line.

If the operator did not observe this and inserted a new sheet before resuming tabulating operations, the sum of the data of the minor group would appear on the new she t. To obviate this condition, the closure of relay points 234a will render the opening of contacts 112 ineffective until points 234a again open. Such opening will, as has been already shown, occur upon deenergization of coil 234 during the next succeeding reset cycle which will take place automatically after all the detail cards accompanying the group signal card have been analyzed and the total thereof printed adjacent to the previously printed group indication.

Another such delaying condition may arise when the card following that whose analysis by the lower brushes is accompanied by the opening of contacts 112, is a major total card. In such event it is desirable to have the major total printed on the same sheet with the previously listed items. To this end energization of coil 269 under control of the perforation in column 23 of the card will cause closure of its points 269a short-circuiting contacts 112 until after the total print and reset cycle which has been initiated by the automatic control contacts. This same control over the stopping of the machine will also take place in the event that a final total card follows the last listed card.

A third condition wherein it is desirable to prevent contacts 112 stopping the machine is presented when the last listed item is printed under control of a total card and such card is followed by an address card. In such case the address card will pass the upper brushes as the total card passes the lower brushes. The concurrent spacing operation at this time will cause opening of contacts 112 but relay points 222a and 234a are both closed at this time, the former under control of column 22 of the address card and the latter under control of column 24.

Points 234a will open during the following reset cycle but points 22a will remain closed until the next tabulating cycle, which as has been pointed out is manually initiated. The reason for holding this circuit closed is to prevent the deenergization of motor control relay 204 during the insertion of a new sheet since, as inspection of Fig. 9 will show, inserting a new sheet involves advancing the feed rack 105 and opening of contacts 112. If these contacts were not short-circuited at this time relay 204 would become deenergized and a further reset cycle would be necessary to reenergize it.

In the particular arrangement wherein a major or final total card follows immediately after the last card of a multiple card group it is desirable that the stopping of the machine be delayed not only until the minor group total is obtained and printed but also until the major or final totals have also been printed on the same sheet. For this purpose relay points 233a (Fig. 16) are wired in parallel with cam contact P11 which opens to break the holding circuit of coil 269 whose points 269a short-circuit contacts 112. Points 233a are closed when their controlling coil 233 is energized under control of the perforation in column 24 of the group signal card. Cam contact P11 is timed to open before cam contact P7 so that upon opening of P11 the holding circuit of coil 269 will remain established during the ensuing listing cycle during which the cards advance past the brushes to initiate another reset cycle before finally coming to rest. This second reset cycle is induced by the regular automatic control devices.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

We claim:

1. In a machine of the class described comprising in combination, record analyzing means, item receiving means adapted to receive entries from successively analyzed records, item entering means for listing data upon a work sheet and means controlled by said item receiving means for causing said item entering means to concurrently and separately list the data received from the several records.

2. In a machine of the class described comprising in combination, record analyzing means, item receiving means adapted to receive entries from successively analyzed records, item entering means for listing data upon a work sheet and means controlled by said item receiving means for causing said item entering means to concurrently and separately and upon a single line of said work sheet, list the data received from the several records.

3. In a machine of the class described, means for analyzing a plurality of record cards sucessively, item listing means for listing data upon a work sheet and means controlled by said analyzing means for concurrently listing the plurality of items derived from said successively analyzed records.

4. In a machine of the class described comprising in combination, means for feeding record cards and total cards record analyzing means, item entering means for listing data upon a work sheet, means for interrupting machine operation when a predetermined number of listings have been effected upon a work sheet and record controlled means operable in response to the analysis of a total card for suppressing the operation of said interrupting means.

5. In a machine of the class described having means for listing data upon a blank form, paper spacing mechanism operable as an incident to each listing operation and automatic means for effecting the operation of said paper spacing mechanism to cause a different spacing action between the first and second listing operations on a form than between other listing operations on the same form.

6. In a machine of the class described having means for analyzing a group of record cards in succession, means for listing data under control of the cards, paper spacing mechanism operable as an incident to each listing operation whereby the items are spaced apart and means operable as an incident to the analysis of the first card of a group for causing said paper spacing mechanism to effect an increased spacing between the first two listed items.

7. In combination in a machine operated by a motor, a member for controlling the operation of the motor, a settable device automatically actuatable a predetermined amount from a zero position to thereafter operate the said member to stop said motor, means for returning said device to its zero position and means controlled by said device in zero position for restarting said motor.

8. In a billing machine for printing items on several work sheets in succession under control of record cards, an entry receiving device adapted to receive data designations under control of record cards, means for feeding a work sheet to printing position and means controlled by said feeding means for causing said entry receiving device to cause printing of the data designation contained therein on said sheet.

GEORGE F. DALY.
JONAS E. DAYGER.